United States Patent
Turaga et al.

(10) Patent No.: US 12,499,044 B2
(45) Date of Patent: Dec. 16, 2025

(54) PAUSING GARBAGE COLLECTION DURING A SEQUENTIAL UNMAPPING PROCESS

(71) Applicant: Sandisk Technologies, Inc., Milpitas, CA (US)

(72) Inventors: Dheemahi Turaga, Bangalore (IN); Sharada Banappa, Bangalore (IN); Santoshi Sravya Remella, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/419,871

(22) Filed: Jan. 23, 2024

(65) Prior Publication Data

US 2025/0238367 A1    Jul. 24, 2025

(51) Int. Cl.
  *G06F 12/02* (2006.01)
(52) U.S. Cl.
  CPC ................ *G06F 12/0253* (2013.01)
(58) Field of Classification Search
  None
  See application file for complete search history.

(56) References Cited

U.S. PATENT DOCUMENTS

2016/0041762 A1*  2/2016  Kanno ............... G11C 29/52
                                                        711/103
2021/0271757 A1*  9/2021  Horspool ............ G06F 21/554

* cited by examiner

*Primary Examiner* — Kannan Shanmugasundaram
(74) *Attorney, Agent, or Firm* — Dentons Durham Jones Pinegar

(57) ABSTRACT

A data storage device includes a command analysis system that analyzes one or more received commands to determine whether a garbage collection process associated with the one or more received commands should be executed or paused. The command analysis system determines the garbage collection process should be paused when one or more command parameters associated with the received command indicate that the command is an unmap command and is sequential with a previously received unmap command. The garbage collection process is paused until a non-sequential command is received or until an operating state of the data storage device indicates that the garbage collection process should be resumed.

20 Claims, 4 Drawing Sheets

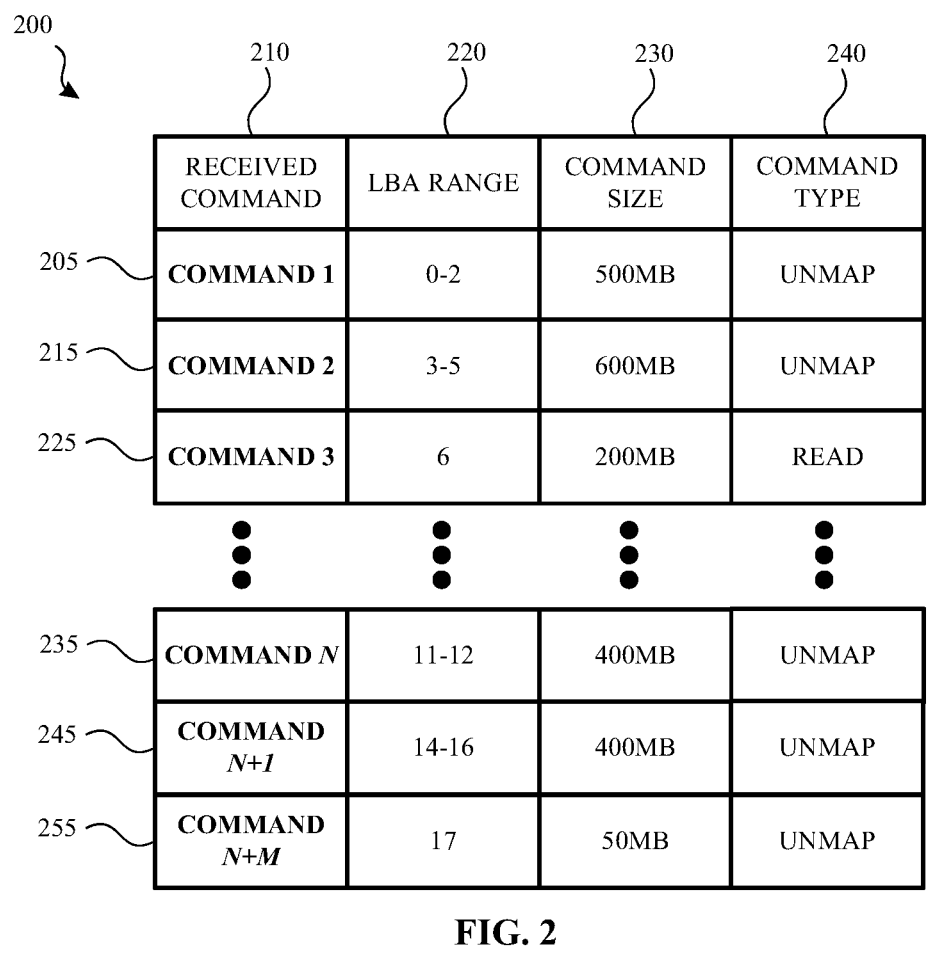

| RECEIVED COMMAND | LBA RANGE | COMMAND SIZE | COMMAND TYPE |
|---|---|---|---|
| COMMAND 1 | 0-2 | 500MB | UNMAP |
| COMMAND 2 | 3-5 | 600MB | UNMAP |
| COMMAND 3 | 6 | 200MB | READ |
| ⋮ | ⋮ | ⋮ | ⋮ |
| COMMAND $N$ | 11-12 | 400MB | UNMAP |
| COMMAND $N+1$ | 14-16 | 400MB | UNMAP |
| COMMAND $N+M$ | 17 | 50MB | UNMAP |

FIG. 2

PAUSING GARBAGE COLLECTION DURING A SEQUENTIAL UNMAPPING PROCESS

BACKGROUND

In some data storage devices, before a garbage collection process is initiated, an unmap command is received and executed. The unmap command causes a controller of the data storage device to invalidate a mapping between a logical block address (LBA) and an associated physical memory block in the data storage device. A valid fragment count (VFC), which is metadata about a memory block that tracks the amount of valid data in the memory block, is also reduced. The memory block may then be identified as a source memory block for the garbage collection process.

During the garbage collection process, valid data in the source memory block is moved to a destination memory block and the source memory block is erased. However, if a subsequent unmap command is received, there is a possibility that the subsequent unmap command will invalidate the data that was just written to the destination memory block. This inefficiency of moving data, which is likely to be invalidated, is more pronounced when a majority of the data on the data storage device is erased and/or during a format operation in which the entire logical addressing range of the data storage device is unmapped and is subsequently erased.

The unnecessary garbage collection operations increase the time it takes to erase data on the data storage device and/or the time it takes to format the data storage device. This leads to various inefficiencies which degrades the performance of the data storage device and negatively impacts a user's experience with the data storage device.

Accordingly, it would be beneficial to improve the garbage collection process to avoid invalidating data that was recently moved to a destination memory block as part of a recently executed garbage collection process.

SUMMARY

The present disclosure describes a data storage device that includes, or is otherwise associated with, a command analysis system. The command analysis system analyzes one or more received commands to determine whether a garbage collection process associated with the one or more received commands should be executed or whether the garbage collection process should be paused or postponed.

For example, when a command is received (e.g., from a host device), the command analysis system analyzes one or more characteristics or command parameters associated with the received command. Based on the characteristics, the command analysis system determines whether the garbage collection process should be temporarily paused. If the characteristics indicate the garbage collection process should be paused, the command analysis system causes a garbage collection system to pause the garbage collection process. As additional commands are received and analyzed by the command analysis system, the command analysis system determines whether the garbage collection process should be resumed or whether the garbage collection process should continue to be paused.

In an example, the command analysis system pauses the garbage collection process when it is determined that the commands are sequential unmap commands and/or when one or more characteristics of the commands indicate that garbage collection pausing criteria are met. Sequential unmap commands are unmap commands that are associated with sequential logical block addresses (LBAs). Thus, if a range of LBAs exceeds a range threshold, a garbage collection process associated with the sequential unmap commands is paused. In an example, garbage collection pausing criteria include a data size threshold (e.g., an amount of data that is to be erased) and/or a minimum number of sectors (or a minimum LBA range) that will be affected by the commands. In an example, the garbage collection process is paused until a non-sequential command (e.g., a write command, a read command and/or a non-sequential unmap command) is received.

Accordingly, examples of the present disclosure describe a method that includes receiving a first command from a host device and determining one or more characteristics associated with the first command. The method also includes receiving a second command from the host device and determining one or more characteristics associated with the second command. A determination is made as to whether a garbage collection process associated with at least one of the first command and the second command should be paused. In an example, the determination is based, at least in part, on the one or more characteristics associated with the first command and the one or more characteristics associated with the second command. The garbage collection process associated with at least one of the first command and the second command is paused based, at least in part, on determining the garbage collection process should be paused.

Another example of the present disclosure describes a data storage device that includes a controller and a command analysis system. In an example, the command analysis system is operable to analyze one or more command parameters associated with a first command and a second command. The command analysis system also determines based, at least in part, on the one or more command parameters, whether to pause a garbage collection process associated with at least one of the first command and the second command. The command analysis system also pauses the garbage collection process based, at least in part, on the determination.

Yet another example of the present disclosure describes a data storage device that includes a control means and a command analysis means. In an example, the command analysis means analyzes one or more command parameters associated with a first command and a second command. The command analysis means also determines based, at least in part, on the one or more command parameters, whether to pause a garbage collection process associated with at least one of the first command and the second command. The data storage device also includes a garbage collection control means operable to pause the garbage collection process when the command analysis means determines the garbage collection process will be paused.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 2 illustrates a command queue according to an example.

DETAILED DESCRIPTION

Figure 1:
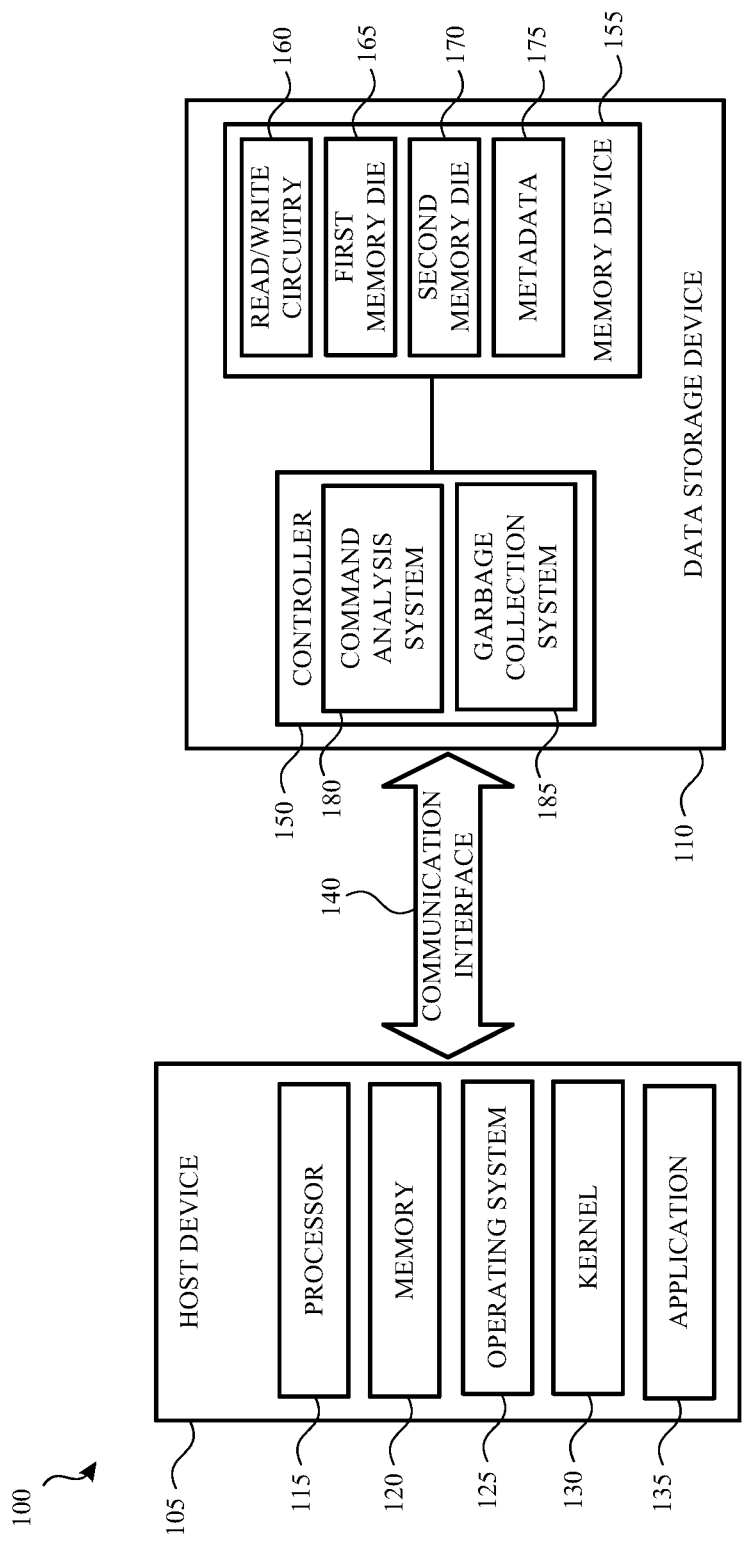
FIG. 1 is a block diagram of a system that includes a host device and a data storage device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

Garbage collection is a process in which valid data in one or more memory blocks of a data storage device is moved to and/or consolidated in a destination memory block. Typically, garbage collection occurs in the background, such as when there are no host commands to be processed or the turnaround time between two host commands is high.

As previously discussed, in some data storage devices, before garbage collection is initiated, an unmap command is received and executed. The unmap command causes a controller of the data storage device to invalidate a mapping between a logical block address (LBA) and an associated physical memory block in the data storage device. A valid fragment count (VFC) of the memory block is also reduced. Based on the VFC, the memory block is identified as a source memory block for garbage collection.

During garbage collection, valid data in the source memory block is moved to a destination memory block and the source memory block is erased. However, if a subsequent unmap command is received, there is a possibility that the subsequent unmap command will invalidate the data that was just written to the destination memory block. This inefficiency of moving data, which is likely to be invalidated, is more pronounced when a majority of the data on the data storage device is erased and/or during a format operation in which the entire logical addressing range of the data storage device is unmapped and is subsequently erased.

The unnecessary garbage collection operations increase the time it takes to erase data on the data storage device and/or format the data storage device, which leads to various inefficiencies and degrades the performance of the data storage device.

It would be beneficial to improve the garbage collection process by selectively pausing or delaying the execution of the garbage collection process instead of invalidating the data after it is moved to a destination memory block as part of a recently executed garbage collection process. Anticipating unmap commands (or using anticipated unmap commands) allows more data to be invalidated, and enables more memory blocks to be consolidated, when compared with current solutions.

Accordingly, the present application describes a command analysis system for a data storage device that is operable to anticipate unmap commands. In an example, the command analysis system is associated with a controller and/or firmware of the data storage device. The command analysis system is also associated with a garbage collection system that initiates and/or pauses one or more garbage collection processes. The command analysis system analyzes one or more received commands to determine whether the garbage collection system should pause a garbage collection process associated with the one or more received commands.

For example, when the data storage system receives one or more commands, the command analysis system analyzes one or more characteristics or command parameters associated with the received commands. The command analysis system determines, based on the one or more characteristics or command parameters, whether the commands are sequential unmap commands. The command analysis system also determines whether one or more garbage collection pausing criteria are met.

If it is determined that the one or more commands are sequential unmap commands (and/or if it is determined that one or more garbage collection pausing criteria are met), the command analysis system causes the garbage collection system to pause a garbage collection process associated with the sequential unmap commands. In an example, the garbage collection process remains paused until a non-sequential unmap command is received and/or until a command, other than an unmap command, is received. In other examples, the garbage collection process is unpaused based, at least in part, on an operating state of the data storage device.

In an example, sequential unmap commands are unmap commands that are associated with sequential logical block addresses (LBAs). Thus, if a range of LBAs associated with the sequential unmap commands exceeds a range threshold and/or a data size threshold, the garbage collection process associated with the sequential unmap commands is paused.

Accordingly, many technical benefits may be realized including, but not limited to, reducing an amount of time that is required to format a data storage device, improving the speed of sequential unmap command execution, improving the efficiency of garbage collection processes by reducing the execution of garbage collection write operations after sequential unmap commands are executed while also enabling garbage collection operations to proceed when non-sequential unmaps or unmap commands of random LBA patterns are received.

These benefits, along with other examples, will be shown and described in greater detail with respect to FIG. 1-FIG. 5.

FIG. 1 is a block diagram of a system 100 that includes a host device 105 and a data storage device 110 according to an example. The host device 105 includes a processor 115 and a memory 120 (e.g., a main memory). The memory 120 may include or otherwise be associated with an operating system 125, a kernel 130 and/or an application 135.

The processor 115 can execute various instructions, such as, for example, instructions from the operating system 125 and/or the application 135. The processor 115 includes circuitry such as a microcontroller, a Digital Signal Processor (DSP), an Application-Specific Integrated Circuit (ASIC), a Field Programmable Gate Array (FPGA), hard-wired logic, analog circuitry and/or various combinations thereof. In an example, the processor 115 includes a System on a Chip (SoC).

In an example, the memory 120 is used by the host device 105 to store data used, or otherwise executed by, the processor 115. Data stored in the memory 120 includes instructions provided by the data storage device 110 via a communication interface 140. The data stored in the memory 120 also includes data used to execute instructions from the operating system 125 and/or one or more applications 135. The memory 120 may be a single memory or may include multiple memories, such as, for example one or more non-volatile memories, one or more volatile memories, or a combination thereof.

In an example, the operating system 125 creates a virtual address space for the application 135 and/or other processes executed by the processor 115. The virtual address space may map to locations in the memory 120. The operating system 125 may also include or otherwise be associated with a kernel 130. The kernel 130 includes instructions for managing various resources of the host device 105 (e.g., memory allocation), handling read and write operations and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or Wi-Fi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

In an example, the data storage device 110 includes a controller 150 and a memory device 155. The controller 150 is communicatively coupled to the memory device 155. In an example, the memory device 155 includes one or more memory dies (e.g., a first memory die 165 and a second memory die 170). Although memory dies are specifically mentioned, the memory device 155 may include any non-volatile memory device, storage device, storage elements or storage medium including NAND flash memory cells and/or NOR flash memory cells.

The memory cells can take the form of solid-state (e.g., flash) memory cells and can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. The memory cells may be arranged in a two-dimensional configuration or a three-dimensional configuration.

In an example, the data storage device 110 is attached to or embedded within the host device 105. In another example, the data storage device 110 is an external device or a portable device that is communicatively or selectively coupled to the host device 105. In yet another example, the data storage device 110 is a component (e.g., a solid-state drive (SSD)) of a network accessible data storage system, a network-attached storage system, a cloud data storage system, and the like.

As previously explained, the memory device 155 of the data storage device 110 includes a first memory die 165 and a second memory die 170. Although two memory dies are shown, the memory device 155 may include any number of memory dies (e.g., one memory die, two memory dies, eight memory dies, or another number of memory dies).

The memory device 155 also includes support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies may include corresponding read/write circuitry 160 that is operable to read data from and/or write data to storage elements within one individual memory die independent of other read and/or write operations on any of the other memory dies.

In an example, each of the first memory die 165 and the second memory die 170 include one or more memory blocks and each memory block includes one or more memory cells. A block of memory cells is the smallest number of memory cells that are physically erasable together. In an example and for increased parallelism, each of the blocks may be operated or organized in larger blocks or metablocks. For example, one block from different planes of memory cells may be logically linked together to form a metablock.

The memory blocks are referred to herein as physical memory blocks because they relate to groups of physical memory cells. As used herein, a logical memory block is a virtual unit of address space defined to have the same size as a physical memory block. Each logical memory block includes a range of logical memory block addresses (LBAs) that are associated with data received from the host device 105. The LBAs are then mapped to one or more physical memory blocks in the data storage device 110 where the data is physically stored.

As previously described, the data storage device 110 also includes a controller 150. The controller 150 is communicatively coupled to the memory device 155 via a bus, an interface or other communication circuitry. In an example, the communication circuitry includes one or more channels to enable the controller 150 to communicate with the first memory die 165 and/or the second memory die 170 of the memory device 155. In another example, the communication circuitry includes multiple distinct channels which enables the controller 150 to communicate with the first memory die 165 independently and/or in parallel with the second memory die 170 of the memory device 155.

The controller 150 also receives data and/or instructions/commands from the host device 105. The controller 150 may also cause data to be sent to the host device 105. For example, the controller 150 may send data to and/or receive data from the host device 105 via the communication interface 140. The controller 150 also sends data and/or commands to and/or receives data from, the memory device 155.

The controller 150 includes or is otherwise associated with a command analysis system 180 and a garbage collection system 185. As will be explained in greater detail herein, the command analysis system 180 analyzes commands that are received from the host device 105. The command analysis system 180 uses the information derived from the analysis to determine whether a garbage collection process associated with one or more of the received commands should be paused or postponed. For example, the command analysis system 180 uses the information to anticipate whether additional unmap commands will be received. The garbage collection system 185 initiates one or more garbage collection processes and/or pauses/resumes a garbage collection process based, at least in part, on data/instructions received from the command analysis system 180. In an example, the garbage collection processes are background processes. The garbage collection processes may be idle time garbage collection processes or balanced (foreground) garbage collection processes.

In an example, when the controller 150 receives data and/or commands, the controller 150 causes the commands to be executed on one or more of the memory dies in the memory device 155. For example, if the command is a write command, the controller 150 causes the memory device 155 to store data associated with the command at a specified physical address or memory block of the memory device 155. If the command is a read command, the controller 150 causes data to be read from the specified physical address of the memory device 155.

In some examples, the command is an unmap command, such as, for example a SCSI Unmap command. When the unmap command is received, the controller 150 invalidates the logical mapping between LBAs and the associated physical memory blocks in the data storage device 110. The controller 150 also reduces a VFC of the memory blocks and/or the memory dies. During a garbage collection process, memory blocks having a VFC below a VFC threshold are selected as a source memory block for the garbage collection process. Any remaining valid data fragments from the source memory block are relocated to a destination memory block and the source memory block is erased and/or freed.

However, as discussed above, in current data storage devices, there is a risk that the data that was relocated to the destination memory block will be invalidated and erased when another unmap command is received. For example, if a first unmap command is received and a garbage collection process is initiated before a second unmap command is received, the second unmap command may cause a second garbage collection process to be initiated. There is a risk that the second garbage collection process will invalidate the data that was transferred to the destination memory block during the first garbage collection process. This is more likely to occur if large amounts of data are being erased, the data storage device is being formatted and/or if the second unmap command is sequential to the first unmap command.

In order to avoid this scenario, the data storage device 110 includes or is otherwise associated with the command analysis system 180. In an example, the command analysis system 180 is part of firmware of the data storage device 110. In another example, the command analysis system 180 is part of or is otherwise associated with the memory device 155.

The command analysis system 180 receives one or more commands that are provided to or are otherwise received by the controller 150. As the commands are received, the command analysis system 180 analyzes one or more characteristics, or command parameters, associated with each command. Based on the command parameters, the command analysis system 180 anticipates whether additional unmap commands will be received and/or determines whether a garbage collection process associated with the commands should be initiated and/or executed by a garbage collection system 185. If additional sequential unmap commands are anticipated, the garbage collection process associated with the commands will be temporarily paused.

For example, as commands are received, the command analysis system 180 determines a command type of the command. The command type includes, but is not limited to, a function that the command is to perform. For example, the command type may indicate that the received command is a write command, a read command or an unmap command. In an example, if the command is an unmap command, the command analysis system 180 also determines a LBA or a range of LBAs associated with the unmap command. In another example, the command analysis system 180 determines an amount or a range of data that will be impacted by the unmap command.

When the unmap command is identified and/or when the one or more command parameters and/or characteristics of the unmap command are analyzed/identified, the command analysis system 180 marks or otherwise identifies the received command as an unmap command. The command analysis system 180 may then determine and/or anticipate whether a garbage collection process associated with the unmap command should be paused or postponed.

In an example, when commands are received from the host device 105, the commands are placed in a command queue. When the command analysis system 180 identifies one of the commands as an unmap command and/or identifies one or more command parameters associated with the command meet one or more garbage collection pausing criteria, the command analysis system 180 analyzes one or more commands in the command queue to determine whether one or more commands in the command queue are also unmap commands. In an example, the command analysis system 180 may also analyze one or more commands the command queue to determine whether one or more garbage collection pausing criteria are met. In an example, the command analysis system 180 determines whether one or more commands in the command queue are unmap commands and/or whether the garbage collection pausing criteria is met by analyzing one or more characteristics or command parameters associated with one or more commands in the command queue.

Based on the one or more command parameters, the command analysis system 180 determines whether the unmap command in the command queue is sequential to or otherwise associated with, the previously received command. For example, the command analysis system 180 determines whether a LBA or LBA range associated with the unmap command in the command queue is sequential to the LBA or LBA range associated with the previously received unmap command. In another example, the command analysis system 180 determines an amount or a range of data that will be impacted by the unmap command and also determines whether the range of data meets or exceeds a range of data threshold of the garbage collection pausing criteria.

If the LBAs are sequential and/or if the range of data impacted by one or more of the unmap commands exceeds a configurable threshold, the command analysis system 180 causes a garbage collection system 185 associated with the controller 150 to pause a garbage collection process associated with at least one of the previously received unmap command and the unmap command in the command queue. However, if the LBAs are not sequential and/or if the garbage collection pausing criteria is not met, the garbage collection process is not paused.

In another example, when the command analysis system 180 identifies a first unmap command, the command analysis system 180 stores information associated with the unmap command. For example, the command analysis system increments an unmap command counter and/or stores one or more command parameters (e.g., a LBA or LBA range) associated with the unmap command. When a second command is received and is identified as an unmap command, the command analysis system 180 compares one or more command parameters associated with the second unmap command to the one or more command parameters associated with the first unmap command. The command analysis system can then determine whether the second unmap command is sequential to the first unmap command (and/or can determine whether one or more garbage collection pausing criteria are met). If the unmap commands are sequential (or the garbage collection pausing criteria are met), the command analysis system 180 causes the garbage collection system 185 to pause garbage collection processes associated with at least one of the first unmap command and/or the second unmap command.

In an example, the garbage collection system 185 causes the garbage collection process to stay in a paused state until the command analysis system 180 receives or identifies a different type of command. In an example, the different type of command is a command that is not an unmap command (e.g., a write command or a read command) or is an unmap command that is not sequential to the previously received unmap commands.

In another example, the garbage collection process remains in a paused state until an operating state of the data storage device 110 and/or the memory device 155 indicates that a garbage collection process should be initiated. For example, if the controller 150, the garbage collection system 185 and/or the command analysis system 180 determines that the data storage device and/or the memory device 155 has under a threshold amount of space remaining (e.g., the memory device is operating in an urgent garbage collection mode and/or the memory device 155 is over a threshold amount of capacity), the garbage collection process is resumed—regardless of whether received commands are sequential unmap commands.

In another example, garbage collection processes related to control blocks that store the metadata 175 of the data storage device may be executed at any time, regardless of the types of commands that are received. In yet another example, regardless of commands that are received and/or based on an operating state of the data storage device 110, idle time garbage collection may be paused while a balanced (foreground) garbage collection process may commence or vice versa.

FIG. 2 illustrates a command queue 200 according to an example. In an example, the received commands 210 in the command queue 200 are received by a controller (e.g., the controller 105 (FIG. 1)) and analyzed by a command analysis system (e.g., the command analysis system 180 (FIG. 1)) to determine whether a garbage collection process associated with one or more of the received commands 210 should be paused. Although a command queue 200 is shown and described, the received commands 210 in the command queue 200 may also represent an order that commands are received and/or analyzed by the command analysis system.

In an example, when a command, such as, for example, Command 1 205, is received by the command analysis system, the command analysis system analyzes one or more command parameters or characteristics associated with the received command 210. The command parameters indicate whether the command is an unmap command and/or whether the command will meet one or more garbage collection pausing criteria. In an example, the one or more command parameters include, but are not limited to, an LBA range 220 associated with the received command 210, a command size 230 associated with the received command 210 and a command type 240 associated with the received command.

In this example, Command 1 205 has a LBA range 220 of 0-2, a command size 230 of 500 megabytes (MB) and is identified as an unmap command (e.g., the command type 240 is "unmap"). In an example, when this information is received and/or identified by the command analysis system, the command analysis system preemptively pauses a garbage collection process associated with Command 1 205 because Command 1 205 is an unmap command. In an example, the garbage collection process is preemptively paused because a subsequent command (e.g., Command 2 215) may not be immediately received by the controller and/or the command analysis system. As such, there could be a chance that a garbage collection process is initiated before Command 2 215 is received.

In another example, when Command 1 205 is identified as an unmap command, the command analysis system analyzes one or more commands in the command queue 200 to determine whether one or more commands in the command queue 200 are sequential unmap commands and/or whether the one or more command parameters associated with the unmap commands meet the garbage collection pausing criteria.

For example, the command analysis system may pause a garbage collection process associated with two or more sequential unmap commands if a configurable unmap size of the two or more unmap commands exceeds or meets a maximum size. In an example, if the two or more sequential unmap commands meets or exceeds the maximum size, the command analysis system anticipates that the data storage device is undergoing a format operation in which the entire logical addressing range of the data storage device is unmapped and all data in the data storage device is erased.

As such, the remaining commands that are received will also be unmap commands and any garbage collection processes associated with the unmap commands should be paused until the Nth (e.g., a final) unmap command is received.

In another example, the command analysis system pauses a garbage collection process associated with two or more commands having any size. In an example and regardless of size, the garbage collection process associated with the unmap commands is paused if a LBA range associated with the commands exceeds a configurable LBA range threshold (e.g., 0x800 sectors) and/or a total size of the two or more commands exceeds a configurable size threshold (e.g., one gigabyte (GB)). Although specific values/ranges are given, these are for example purposes only.

For example, when Command 1 205 is received and/or is identified as an unmap command, the command analysis system receives and/or analyzes Command 2 215. As shown in FIG. 2, Command 2 215 has an LBA range 220 of 3-5, a command size 230 of 600 MB and is also an unmap command. Because Command 2 215 has an LBA range 220 that is sequential to the LBA range of Command 1 205 (and/or because command size 230 of Command 1 205 and Command 2 215 exceed a command size threshold associated with the garbage collection pausing criteria), the command analysis system determines that Command 2 215 is sequential to Command 1 205. As such, a garbage collection process associated with Command 1 205 and/or Command 2 215 is paused.

Continuing with the example, the command analysis system subsequently receives Command 3 225. In this example, Command 3 225 has a LBA range 220 of 6, has a command size 230 of 200 MB and is identified as a read command. Because Command 3 225 is a read command, the command analysis system unpauses the garbage collection process associated with Command 1 205 and/or Command 2 215. This process repeats for any number of subsequently received and/or analyzed commands.

For example, when Command N 235 is received, the command analysis system determines the LBA range 220 associated with Command N 235 is 11-12, determines the command size 230 is 400 MB and determines that the command is an unmap command. If a previously received command (e.g., Command N-1) was also an unmap command and if Command N 235 has an LBA range that is sequential to the LBA range of Command N-1, the command analysis system may determine to pause (or maintain a pause) on any garbage collection processes associated with Command N-1 and/or Command N 235.

When Command N+1 245 is received and/or analyzed by the command analysis system, the command analysis system determines that Command N+1 245 is an unmap command. However, the command analysis system also determines that Command N+1 245 is not sequential to Command N 235. For example, the LBA range 220 associated with Command N+1 245 is 14-16 but the LBA range 220 associated with Command N 235 is 11-12. Because the LBA range of the two commands is not sequential, a garbage collection process associated with Command N+1 245 is not paused. Additionally, if a garbage collection process associated with Command N 235 had been paused, the control analysis system causes a garbage collection system (e.g., the garbage collection system 185 (FIG. 1)) to initiate the garbage collection process associated with Command N 235.

When Command N+M 255 is received, the command analysis system determines that Command N+M 255 is an unmap command, has an LBA range 220 of 17 and a command size 230 of 50 MB. In this example, although Command N+M 255 is an unmap command and is sequential to Command N+1 245, the combined command size 230 of Command N+M 255 and Command N+1 245 does not exceed the command size threshold of the garbage collection pausing criteria. As such, the command analysis system determines that pausing a garbage collection process associated with at least one of Command N+M 255 and/or Command N+1 245 is not necessary.

Figure 3:
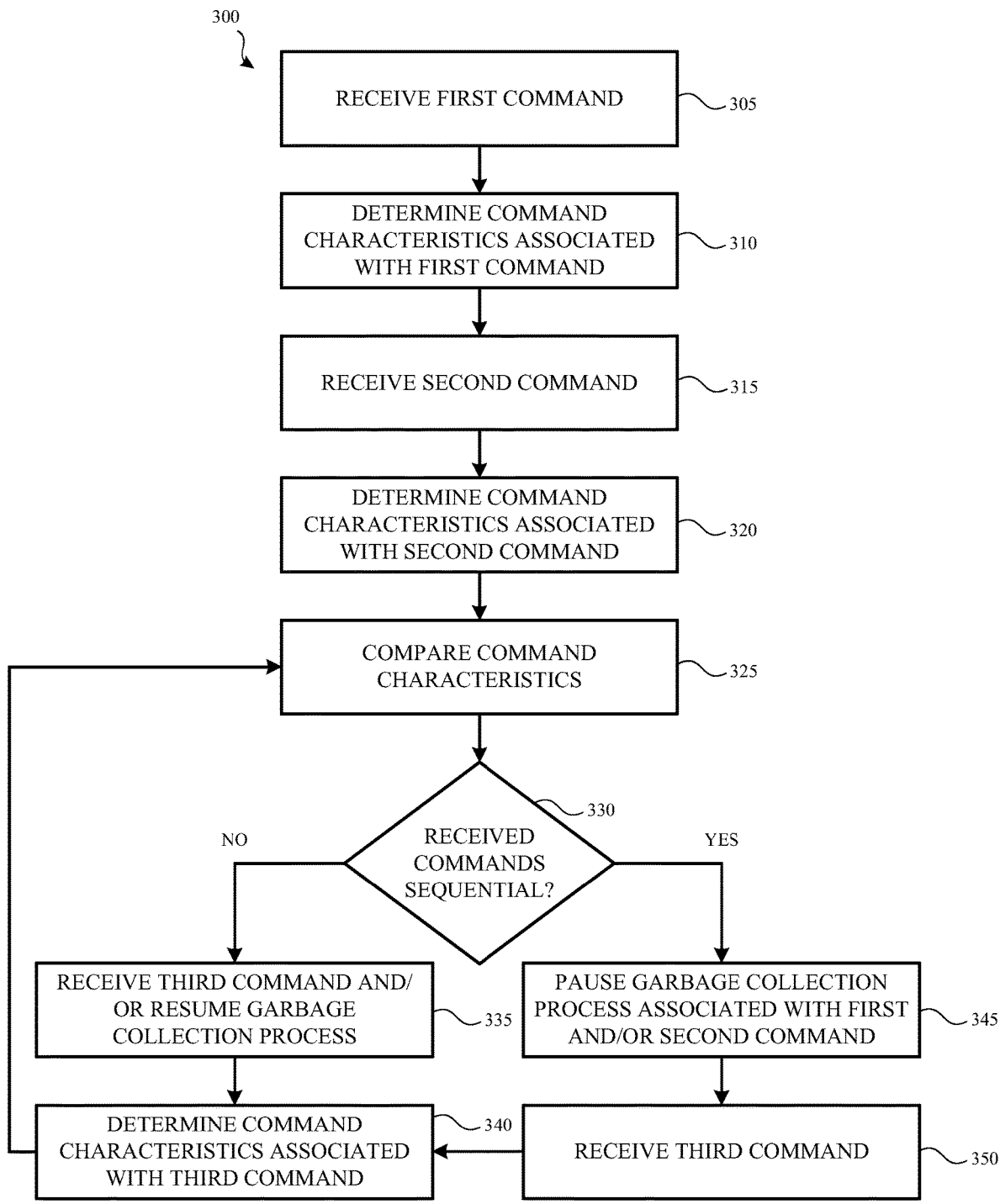
FIG. 3 illustrates a method for analyzing received commands to determine whether a garbage collection process associated with the received commands should be paused or resumed according to an example.

FIG. 3 illustrates a method 300 for analyzing received commands to determine whether a garbage collection process associated with the received commands should be paused or resumed according to an example. In an example, the method 300 is performed by a controller and/or a command analysis system of a data storage device, such as, for example, the controller 150 and/or the command analysis system 180 of the data storage device 110 shown and described with respect to FIG. 1.

Method 300 begins when a command is received (305). In an example, the command is issued from a host device and received by the controller and/or the command analysis system of the data storage device associated with the host device.

When the command is received, the command analysis system analyzes the command to determine (310) one or more command characteristics associated with the command. In an example, the one or more command characteristics include a starting LBA associated with the command, a range of LBAs associated with the command, a size of data associated with the command and/or a command type of the command. Although specific command characteristics are mentioned, other command characteristics may be identified or determined.

The command analysis system also receives (315) a second command. When the second command is received, the command analysis system analyzes the second command to determine (320) one or more command characteristics associated with the second command. In an example, the command characteristics of the second command are similar to the command characteristics associated with the first command.

The command analysis system then compares (325) the command characteristics associated with the first command to the command characteristics associated with the second command. The comparison is used to determine whether the second command is sequential to the first command. The comparison may also be used to determine whether one or more garbage collection pausing criteria are met. In some examples, the comparison of command characteristics occurs only if the first command and the second command are identified as unmap commands.

Based on the comparison, the command analysis system determines (330) whether the second command is sequential to the first command. The command characteristics may also be used to determine whether a garbage collection process associated with the first command and/or the second command should be paused based, at least in part, on whether the command characteristics meet garbage collection pausing criteria (e.g., whether a command size threshold is met, whether an LBA range threshold is met).

If it is determined (330) that the second command is not sequential to the first command and/or if it is determined that the garbage collection pausing criteria is not met, a third command is received and/or analyzed and/or a garbage collection process associated with one or more of the first command and/or the second command is resumed (335) and/or executed.

In examples in which a third command is received, the command analysis system determines (340) command characteristics associated with the third command. The command characteristics associated with the third command are then compared (325) with the command characteristics of the second command and the operations repeat. In an example, the command characteristics associated with the third command are only compared with the command characteristics of the second command if one or both of the second command and the third command are identified as unmap commands.

However, if it is determined (330) that the second command is sequential to the first command and/or if it is determined that the command characteristics of the first command and/or the second command meet the garbage collection pausing criteria, the command analysis system causes the garbage collection system to pause (345) a garbage collection process associated with the first command and/or the second command.

The command analysis system also receives (350) a third command and determines (340) command characteristics associated with the third command. The command characteristics associated with the third command are then compared (325) with the command characteristics of the second command and the operations repeat. In an example, the command characteristics associated with the third command are only compared with the command characteristics of the second command if the third command is identified as an unmap command.

In an example, these operations repeat any number of times. However, in some examples, the method 300 may be paused and/or resumed based, at least in part, on an operating state of the data storage device. For example, if the data storage device is operating in an urgent mode because available space in the data storage device is below a threshold, one or more garbage collection processes are executed to free up space in the data storage device. In an example, when an amount of available space in the data storage device is above a threshold, the method 300 resumes.

Figure 4:
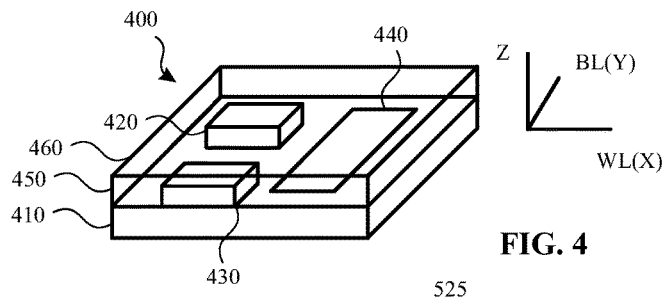
FIG. 4 is a perspective view of a storage device that includes three-dimensional (3D) stacked non-volatile memory according to an example.
Figure 5:
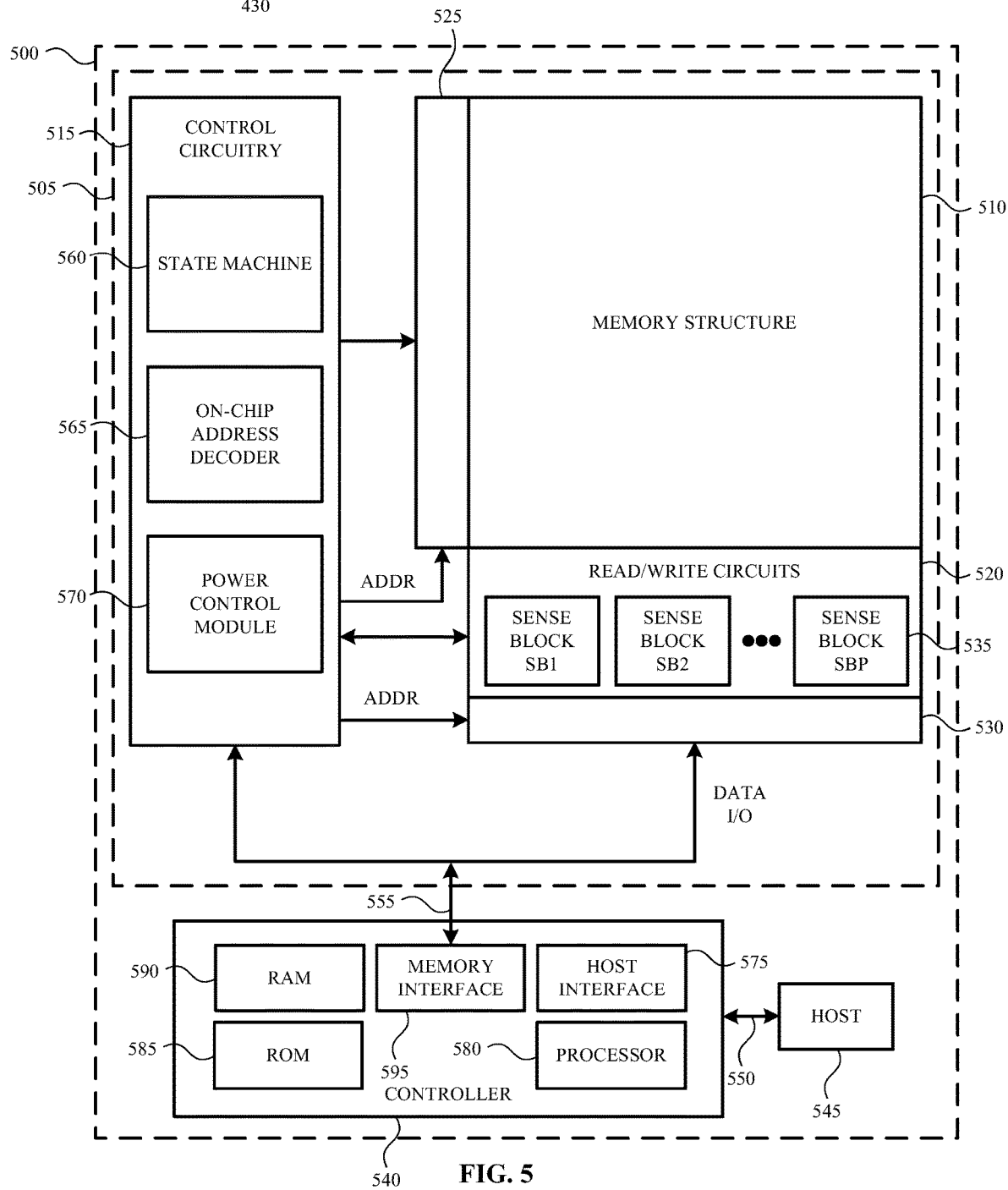
FIG. 5 is a block diagram of a data storage device according to an example.

FIG. 4-FIG. 5 describe example storage devices that may be used with or otherwise implement the various features described herein. For example, the storage devices shown and described with respect to FIG. 4-FIG. 5 may include various systems and components that are similar to the systems and components shown and described with respect to FIG. 1. For example, the controller 540 shown and described with respect to FIG. 5 may be similar to the controller 150 of FIG. 1. Likewise, the memory dies 505 may be similar to the first memory die 165 and/or the second memory die 170 of FIG. 1.

FIG. 4 is a perspective view of a storage device 400 that includes three-dimensional (3D) stacked non-volatile memory according to an example. In this example, the storage device 400 includes a substrate 410. Blocks of memory cells are included on or above the substrate 410. The blocks may include a first block 420 (BLK0) and a second block 430 (BLK1). Each block may be formed of memory cells (e.g., non-volatile memory elements). The substrate 410 may also include a peripheral area 440 having support circuits that are used by the first block 420 and the second block 430. The peripheral area 440 may be located beneath the first block 420 and the second block 430. In another example, the peripheral area may be included on a different substrate or die.

The substrate 410 may also carry circuits under the blocks, along with one or more lower metal layers which are patterned in conductive paths to carry signals from the circuits. The blocks may be formed in an intermediate region 450 of the storage device 400. The storage device may also include an upper region 460. The upper region 460 may include one or more upper metal layers that are patterned in conductive paths to carry signals from the circuits. Each block of memory cells may include a stacked area of memory cells. In an example, alternating levels of the stack represent wordlines. While two blocks are depicted, additional blocks may be used and extend in the x-direction and/or the y-direction.

In an example, a length of a plane of the substrate 410 in the x-direction represents a direction in which signal paths for wordlines or control gate lines extend (e.g., a word line or drain-end select gate (SGD) line direction) and the width of the plane of the substrate 410 in the y-direction represents a direction in which signal paths for bit lines extend (e.g., a bit line direction). The z-direction represents a height of the storage device 400.

FIG. 5 is a functional block diagram of a storage device 500 according to an example. In an example, the storage device 500 may be the 3D stacked non-volatile storage device 400 shown and described with respect to FIG. 4. The components depicted in FIG. 5 may be electrical circuits. In an example, the storage device 500 includes one or more memory dies 505. Each memory die 505 includes a three-dimensional memory structure 510 of memory cells (e.g., a 3D array of memory cells), control circuitry 515, and read/write circuits 520. In another example, a two-dimensional array of memory cells may be used. The memory structure 510 is addressable by wordlines using a first decoder 525 (e.g., a row decoder) and by bit lines using a second decoder 530 (e.g., a column decoder). The read/write circuits 520 may also include multiple sense blocks 535 including SB1, SB2, . . . , SBp (e.g., sensing circuitry) which allow pages of the memory cells to be read or programmed in parallel. The sense blocks 535 may include bit line drivers.

In an example, a controller 540 is included in the same storage device 500 as the one or more memory dies 505. In another example, the controller 540 is formed on a die that is bonded to a memory die 505, in which case each memory die 505 may have its own controller 540. In yet another example, a controller die controls all of the memory dies 505.

Commands and data may be transferred between a host 545 and the controller 540 using a data bus 550. Commands and data may also be transferred between the controller 540 and one or more of the memory dies 505 by way of lines 555. In one example, the memory die 505 includes a set of input and/or output (I/O) pins that connect to lines 555.

The memory structure 510 may also include one or more arrays of memory cells. The memory cells may be arranged in a three-dimensional array or a two-dimensional array. The memory structure 510 may include any type of non-volatile memory that is formed on one or more physical levels of arrays of memory cells having an active area disposed above a silicon substrate. The memory structure 510 may be in a non-volatile memory device having circuitry associated with the operation of the memory cells, whether the associated circuitry is above or within the substrate.

The control circuitry 515 works in conjunction with the read/write circuits 520 to perform memory operations (e.g., erase, program, read, and others) on the memory structure 510. The control circuitry 515 may include registers, ROM fuses, and other devices for storing default values such as base voltages and other parameters.

The control circuitry 515 may also include a state machine 560, an on-chip address decoder 565, and a power control module 570. The state machine 560 may provide chip-level control of various memory operations. The state machine 560 may be programmable by software. In another example, the state machine 560 does not use software and is completely implemented in hardware (e.g., electrical circuits).

The on-chip address decoder 565 may provide an address interface between addresses used by host 545 and/or the controller 540 to a hardware address used by the first decoder 525 and the second decoder 530.

The power control module 570 may control power and voltages that are supplied to the wordlines and bit lines during memory operations. The power control module 570 may include drivers for word line layers in a 3D configuration, select transistors (e.g., SGS and SGD transistors) and source lines. The power control module 570 may include one or more charge pumps for creating voltages.

The control circuitry 515, the state machine 560, the on-chip address decoder 565, the first decoder 525, the second decoder 530, the power control module 570, the sense blocks 535, the read/write circuits 520, and/or the controller 540 may be considered one or more control circuits and/or a managing circuit that perform some or all of the operations described herein.

In an example, the controller 540, is an electrical circuit that may be on-chip or off-chip. Additionally, the controller 540 may include one or more processors 580, ROM 585, RAM 590, memory interface 595, and host interface 575, all of which may be interconnected. In an example, the one or more processors 580 is one example of a control circuit. Other examples can use state machines or other custom circuits designed to perform one or more functions. Devices such as ROM 585 and RAM 590 may include code such as a set of instructions. One or more of the processors 580 may be operable to execute the set of instructions to provide some or all of the functionality described herein.

Alternatively or additionally, one or more of the processors 580 may access code from a memory device in the memory structure 510, such as a reserved area of memory cells connected to one or more wordlines. The memory interface 595, in communication with ROM 585, RAM 590, and one or more of the processors 580, may be an electrical circuit that provides an electrical interface between the controller 540 and the memory die 505. For example, the memory interface 595 may change the format or timing of signals, provide a buffer, isolate from surges, latch I/O, and so forth.

The one or more processors 580 may issue commands to control circuitry 515, or any other component of memory die 505, using the memory interface 595. The host interface 575, in communication with the ROM 585, the RAM 595, and the one or more processors 580, may be an electrical circuit that provides an electrical interface between the controller 540 and the host 545. For example, the host interface 575 may change the format or timing of signals, provide a buffer, isolate from surges, latch I/O, and so on. Commands and data from the host 545 are received by the controller 540 by way of the host interface 575. Data sent to the host 545 may be transmitted using the data bus 550.

Multiple memory elements in the memory structure 510 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a RAM configuration.

Based on the above, examples of the present disclosure describe receiving a first command from a host device; determining one or more characteristics associated with the first command; receiving a second command from the host device; determining one or more characteristics associated with the second command; determining based, at least in part, on the one or more characteristics associated with the first command and the one or more characteristics associated with the second command, whether a garbage collection process associated with at least one of the first command and the second command should be paused; and pausing the garbage collection process associated with at least one of the first command and the second command based, at least in part, on determining the garbage collection process should be paused. In an example, the method also includes receiving a third command from the host device; determining one or more characteristics associated with the third command; and unpausing the garbage collection process associated with at least one of the first command and the second command based, at least in part, on the one or more characteristics associated with the third command. In an example, the third command is selected from a group comprising: a write command; and a read command. In an example, the first command is a first unmap command, the second command is a second unmap command that is sequential to the first unmap command and the third command is a third unmap command that is non-sequential to the second unmap command. In an example, the method also includes receiving a third command from the host device; determining one or more characteristics associated with the third command; and maintaining the pause on the garbage collection process based, at least in part, on the one or more characteristics associated with the third command. In an example, the one or more characteristics associated with the first command and the one or more characteristics associated with the second command include one or more of: a logical block address (LBA) range associated with the first command and the second command; a size of data associated with the first command and the second command; and a number of sectors associated with the first command and the second command. In an example, the one or more characteristics of the first command and the one or more characteristics of the second command are associated with garbage collection pausing criteria. In an example, the method also includes resuming the garbage collection process based, at least in part, on an operating state of the data storage device.

Additional examples describe a data storage device, comprising: a controller; and a command analysis system operable to: analyze one or more command parameters associated with a first command and a second command; determine, based at least in part, on the one or more command parameters whether to pause a garbage collection process associated with at least one of the first command and the second command; and pausing the garbage collection process based, at least in part, on the determination. In an example, the command analysis system is further operable to: analyze one or more command parameters associated with a third command; and resume the garbage collection process associated with the at least one of the first command and the second command based, at least in part, on the one or more command parameters associated with the third command. In an example, the third command is one of a write command or a read command. In an example, the first command is a first unmap command, the second command is a second unmap command that is sequential to the first unmap command and the third command is a third unmap command that is non-sequential to the second unmap command. In an example, the command analysis system is further operable to: analyze one or more command parameters associated with a third command; and maintain the pause on the garbage collection process associated with the at least one of the first command and the second command based, at least in part, on the one or more command parameters associated with the third command. In an example, the one or more command parameters associated with the first command and the one or more command parameters associated with the second command include one or more of: a logical block address (LBA) range associated with the first command and the second command; a size of data associated with the first command and the second command; and a number of sectors associated with the first command and the second command. In an example, the one or more command parameters of the first command and the one or more command parameters of the second command are associated with garbage collection pausing criteria. In an example, the command analysis system is further operable to resume the garbage collection process based, at least in part, on an operating state of the data storage device.

Still other examples describe a data storage device, comprising: a control means; and a command analysis means operable to: analyze one or more command parameters associated with a first command and a second command; and determine, based at least in part, on the one or more command parameters whether to pause a garbage collection process associated with at least one of the first command and the second command; and a garbage collection control means operable to pause the garbage collection process when the command analysis means determines the garbage collection process will be paused. In an example, the command analysis means is further operable to analyze one or more command parameters associated with a third command and wherein the garbage control means is further operable to resume the garbage collection process based, at least in part, on the one or more command parameters associated with the third command. In an example, the third command is one of a write command or a read command. In an example, the first command is a first unmap command, the second command is a second unmap command that is sequential to the first unmap command and the third command is a third unmap command that is non-sequential to the second unmap command.

One of ordinary skill in the art will recognize that the technology described herein is not limited to a single specific memory structure, but covers many relevant memory structures within the spirit and scope of the technology as described herein and as understood by one of ordinary skill in the art.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:
1. A method, comprising:
receiving a first command from a host device;
determining one or more characteristics associated with the first command;
receiving a second command from the host device;

determining one or more characteristics associated with the second command;
determining based, at least in part, on the one or more characteristics associated with the first command and the one or more characteristics associated with the second command, whether a logical block address (LBA) associated with the second command is sequential to a LBA associated with the first command and whether a garbage collection process associated with at least one of the first command and the second command should be paused; and
pausing the garbage collection process associated with at least one of the first command and the second command based, at least in part, on determining the LBA associated with the second command is sequential to the LBA associated with the first command and on determining the garbage collection process should be paused.

2. The method of claim 1, further comprising:
receiving a third command from the host device;
determining one or more characteristics associated with the third command; and
unpausing the garbage collection process associated with at least one of the first command and the second command based, at least in part, on the one or more characteristics associated with the third command.

3. The method of claim 2, wherein the third command is selected from a group comprising:
a write command; and
a read command.

4. The method of claim 2, wherein the first command is a first unmap command, the second command is a second unmap command that is sequential to the first unmap command and the third command is a third unmap command that is non-sequential to the second unmap command.

5. The method of claim 1, further comprising:
receiving a third command from the host device;
determining one or more characteristics associated with the third command; and
maintaining the pause on the garbage collection process based, at least in part, on the one or more characteristics associated with the third command.

6. The method of claim 1, wherein the one or more characteristics associated with the first command and the one or more characteristics associated with the second command include one or more of:
a LBA range associated with the first command and the second command;
a size of data associated with the first command and the second command; and
a number of sectors associated with the first command and the second command.

7. The method of claim 1, wherein the one or more characteristics of the first command and the one or more characteristics of the second command are associated with garbage collection pausing criteria.

8. The method of claim 1, further comprising resuming the garbage collection process based, at least in part, on an operating state of a data storage device.

9. A data storage device, comprising:
a controller; and
a command analysis system operable to:
analyze one or more command parameters associated with a first command and a second command;
determine, based at least in part, on the one or more command parameters whether a logical block address (LBA) associated with the second command is sequential to a LBA associated with the first command and whether to pause a garbage collection process associated with at least one of the first command and the second command; and
pause the garbage collection process based, at least in part, on the determination.

10. The data storage device of claim 9, wherein the command analysis system is further operable to:
analyze one or more command parameters associated with a third command; and
resume the garbage collection process associated with the at least one of the first command and the second command based, at least in part, on the one or more command parameters associated with the third command.

11. The data storage device of claim 10, wherein the third command is one of a write command or a read command.

12. The data storage device of claim 10, wherein the first command is a first unmap command, the second command is a second unmap command that is sequential to the first unmap command and the third command is a third unmap command that is non-sequential to the second unmap command.

13. The data storage device of claim 9, wherein the command analysis system is further operable to:
analyze one or more command parameters associated with a third command; and
maintain the pause on the garbage collection process associated with the at least one of the first command and the second command based, at least in part, on the one or more command parameters associated with the third command.

14. The data storage device of claim 9, wherein the one or more command parameters associated with the first command and the one or more command parameters associated with the second command include one or more of:
a LBA range associated with the first command and the second command;
a size of data associated with the first command and the second command; and
a number of sectors associated with the first command and the second command.

15. The data storage device of claim 9, wherein the one or more command parameters of the first command and the one or more command parameters of the second command are associated with garbage collection pausing criteria.

16. The data storage device of claim 9, wherein the command analysis system is further operable to resume the garbage collection process based, at least in part, on an operating state of the data storage device.

17. A data storage device, comprising:
a control means; and
a command analysis means operable to:
analyze one or more command parameters associated with a first command and a second command; and
determine based, at least in part, on the one or more command parameters whether a logical block address (LBA) associated with the second command is sequential to a LBA associated with the first command; and
determine whether to pause a garbage collection process associated with at least one of the first command and the second command based, at least in part, on determining the LBA associated with the second command is sequential to the LBA associated with the first command; and a garbage collection control means operable to pause the garbage collection process in response to the command analysis means determining the garbage collection process will be paused.

18. The data storage device of claim 17, wherein the command analysis means is further operable to analyze one or more command parameters associated with a third command and wherein the garbage collection control means is further operable to resume the garbage collection process based, at least in part, on the one or more command parameters associated with the third command.

19. The data storage device of claim 18, wherein the third command is one of a write command or a read command.

20. The data storage device of claim 18, wherein the first command is a first unmap command, the second command is a second unmap command that is sequential to the first unmap command and the third command is a third unmap command that is non-sequential to the second unmap command.

* * * * *